United States Patent
Kalyanasundharam et al.

(10) Patent No.: US 11,822,484 B2
(45) Date of Patent: Nov. 21, 2023

(54) LOW POWER CACHE

(71) Applicant: Advanced Micro Devices, Inc., Santa Clara, CA (US)

(72) Inventors: Vydhyanathan Kalyanasundharam, Sunnyvale, CA (US); John Wuu, Fort Collins, CO (US); Chintan S. Patel, San Antonio, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/556,257

(22) Filed: Dec. 20, 2021

(65) Prior Publication Data

US 2023/0195642 A1  Jun. 22, 2023

(51) Int. Cl.
*G06F 12/08* (2016.01)
*G06F 12/0895* (2016.01)
*G06F 13/16* (2006.01)
*G06F 12/0891* (2016.01)
*G06F 12/0811* (2016.01)

(52) U.S. Cl.
CPC ...... *G06F 12/0895* (2013.01); *G06F 12/0811* (2013.01); *G06F 12/0891* (2013.01); *G06F 13/1668* (2013.01)

(58) Field of Classification Search
CPC ............ G06F 12/0895; G06F 12/0811; G06F 12/0891; G06F 13/00; G06F 13/1668
See application file for complete search history.

(56) References Cited

U.S. PATENT DOCUMENTS

| | | |
|---|---|---|
| 5,872,944 A | 2/1999 | Goldrian et al. |
| 6,553,445 B1 | 4/2003 | Drapkin et al. |
| 2005/0080952 A1 | 4/2005 | Oner et al. |
| 2010/0077125 A1 | 3/2010 | Park et al. |
| 2015/0006805 A1* | 1/2015 | Feekes .............. G06F 1/32 711/105 |
| 2016/0291678 A1 | 10/2016 | Sadowski et al. |
| 2017/0337951 A1 | 11/2017 | Hollis et al. |
| 2018/0336135 A1* | 11/2018 | Blake ............ G06F 12/0817 |
| 2020/0251159 A1 | 8/2020 | Lanka et al. |
| 2020/0341902 A1* | 10/2020 | Ambroladze ...... G06F 12/0891 |
| 2022/0103191 A1* | 3/2022 | Ganapathy ........ H03M 13/3761 |

FOREIGN PATENT DOCUMENTS

| JP | 10105308 A | 2/1999 |
|---|---|---|
| KR | 20210130088 A | 10/2021 |

OTHER PUBLICATIONS

International Search Report and Written Opinion for International Application No. PCT/US2022/052644 dated Apr. 28, 2023, 7 pages.

* cited by examiner

*Primary Examiner* — Tuan V Thai
(74) *Attorney, Agent, or Firm* — Polansky & Associates, P.L.L.C.; Paul J. Polansky

(57) ABSTRACT

A cache includes an upstream port, a cache memory for storing cache lines each having a line width, and a cache controller. The cache controller is coupled to the upstream port and the cache memory. The upstream port transfers data words having a transfer width less than the line width. In response to a cache line fill, the cache controller selectively determines data bus inversion information for a sequence of data words having the transfer width, and stores the data bus inversion information along with selected inverted data words for the cache line fill in the cache memory.

15 Claims, 5 Drawing Sheets

LOW POWER CACHE

BACKGROUND

Computer systems such as laptops, notebooks, smart phones, tablets, etc. typically contain a system-on-chip (SOC) that integrates many components of the computer system on a single integrated circuit chip. For example, an SOC may include one or more central processing unit (CPU) cores, a graphics controller, one or more memory controllers to interface to external memory components, and input/output controllers to interface to off-chip input/output peripheral circuits. Since many of these devices work in portable applications powered by a battery, low power consumption has become an important feature of these SOCs.

Functional blocks within the SOC exchange data with each other over wide internal buses. For example, a CPU may request data that is stored in external memory through a cache which brings the data on-chip through the memory controller and forwards the data to the CPU while saving a copy for later access. These accesses typically occur in multiple cycles over wide internal buses. When the SOC conducts the data on the buses over the multiple cycles, on average many data lines switch logic states, which repeatedly stores and discharges the highly-capacitive bus lines and increases power consumption. In addition, because these signal lines switch logic states at about the same time, they cause power and ground bounce that can cause glitches, noise, signal skewing, and other undesirable effects on adjacent signal lines and circuits in the SOC.

Figure 1:
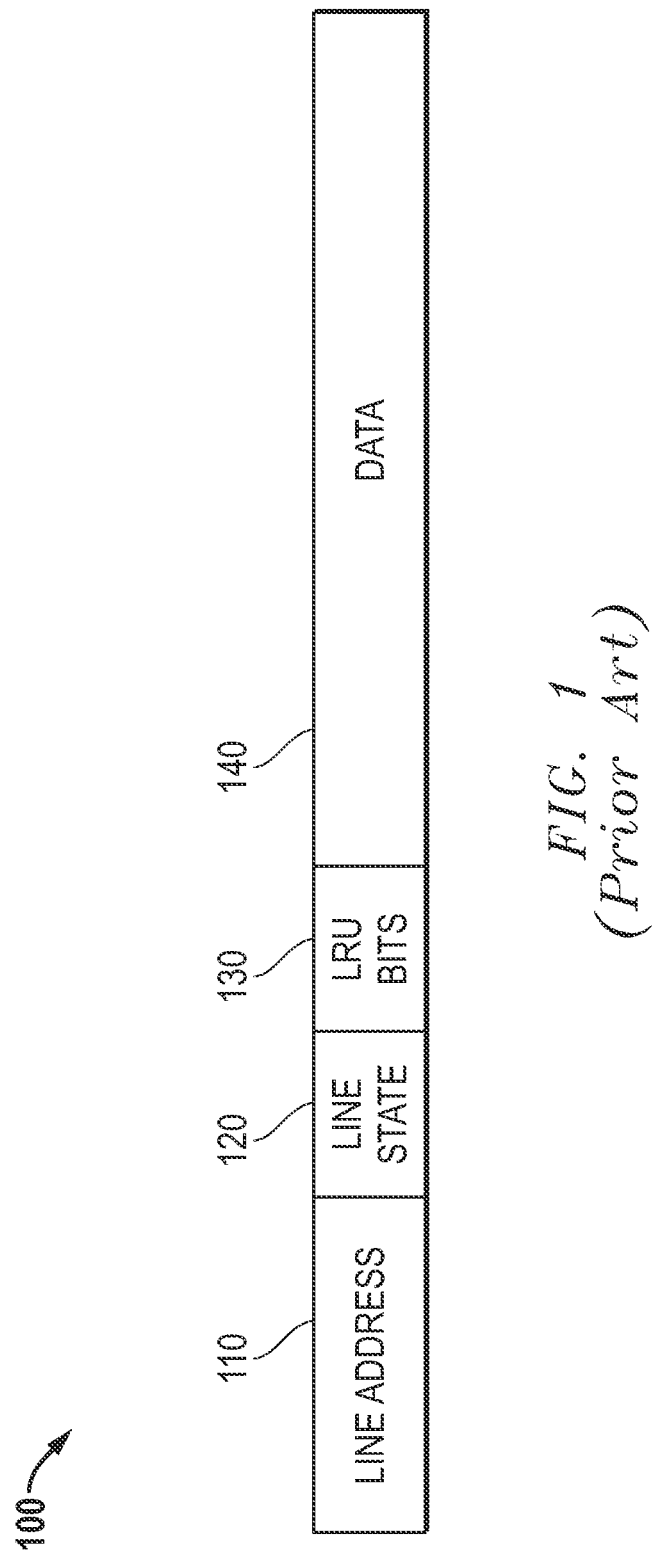
FIG. 1 illustrates in block diagram form a cache line known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A cache includes an upstream port, a cache memory for storing cache lines each having a line width, and a cache controller. The cache controller is coupled to the upstream port and the cache memory. The upstream port transfers data words having a transfer width less than the line width. In response to a cache line fill, the cache controller selectively determines data bus inversion information for a sequence of data words having the transfer width, and stores the data bus inversion information along with selected inverted data words for the cache line fill in the cache memory.

A data processing system includes a plurality of memory access requestors, a plurality of memory access responders, a data fabric for selectively coupling the plurality of memory access requestors to the plurality of memory access responders, and a cache. The cache is coupled to the data fabric, and includes a cache memory and a cache controller. The cache memory stores cache lines each having a line width. The cache controller is coupled to the cache memory, and transfers data words having a transfer width less than the line width. In response to a cache line fill, the cache controller selectively determines data bus inversion information for a sequence of data words having the transfer width, and stores the data bus inversion information along with selected inverted data words for the cache line fill in the cache memory.

A method of reducing energy consumption of a data processing system having a cache includes receiving a cache line, wherein the cache line includes a plurality of data words. A state of the cache line is set to a data inversion mask state. For each data word, whether more than half of a plurality of data bits in the data word transition between a prior data word and the data word is determined. If so, each of the plurality of data bits in the data word before storing an inverted data word in the cache is inverted, and a corresponding data bus inversion bit is set. If not, the data word is stored in the cache without inverting any of the plurality of data bits, and the corresponding data bus inversion bi is cleared.

FIG. 1 illustrates in block diagram form a cache line 100 known in the prior art. Cache line 100 generally includes a line address 110, a line state 120, least recently used (LRU) bits 130, and a data field 140.

Line address 110 indicates the location of the cache line in main memory, and is a portion of the memory address. For example, if data field 140 stores 64 bytes of data, then line address 110 includes all but the least-significant six bits of the memory address, with the remaining address bits implied in the order of the data elements in data field 140.

Line state 120 and LRU bits 130 store metadata for cache line 100. Line state 120 indicates the state of the cache line that is useful for a variety of purposes, including line replacement and coherency between other caches in the system. In a typical implementation, line state 120 stores a set of bits to implement the "MOESI" protocol. According to the MOESI protocol, line state 120 indicates which MOESI state the line is in, including bits that indicate that the cache line has been modified (M), that the cache line is exclusive (E) or shared (S), or that the cache line is invalid (I). An Owned (O) state indicates that the line is modified in one cache, that there may be shared copies in other caches and that the data in memory is stale. Using this protocol, the cache can determine whether to find an updated copy in another cache in the system. The MOESI protocol and these specific bits are just examples of line states that may be used. LRU bits 130 indicate the age of the cache line. When the cache is full and requests data from another line, a cache controller must find a place to store the new cache line, and uses LRU bits 130 to determine which line to evict.

Data, field 140 contains the data of the cache line. In the example of 64 B cache lines noted above, the cache will typically require several cycles to store all 64 B of data into or read all 64 B of data from data field 140. For example, if the cache's external data bus is 32 bits wide, the transfer of the cache line to another location will take 16 cycles. Such a transfer, which occurs frequently during periods of high workload, can consume a significant amount of power during the bus transfers.

Figure 2:
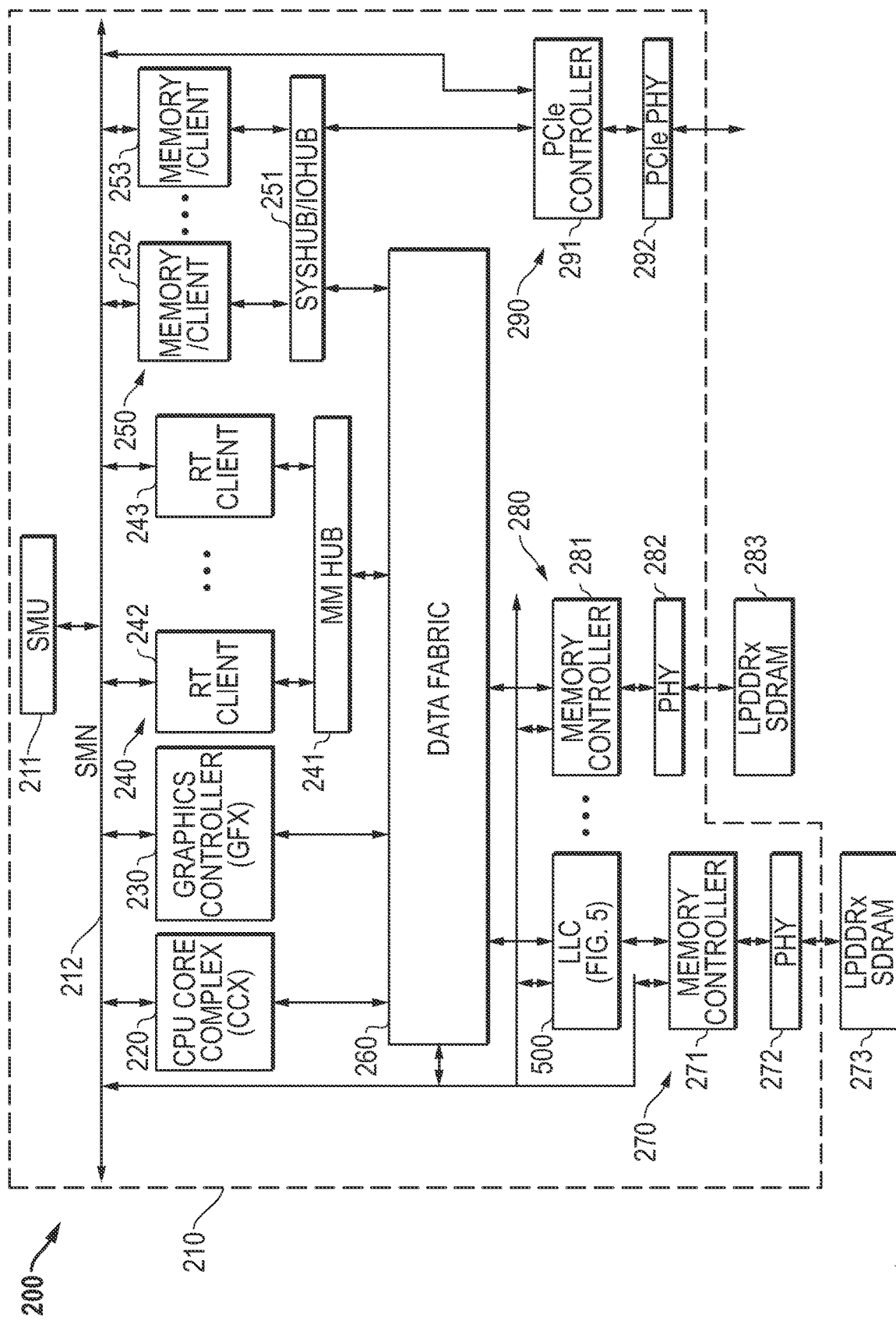
FIG. 2 illustrates in block diagram form a data processing system according to some embodiments.

FIG. 2 illustrates in block diagram form a data processing system 200 according to some embodiments. Data processing system 200 includes a data processor in the form of an SOC 210 and external memories 372 and 283 in the form of low-power Double Data Rate synchronous dynamic random-access memories (LPDDRx SDRAMs). Many other components of an actual data processing system are typically present but are not relevant to understanding the present disclosure and are not shown in FIG. 2 for ease of illustration.

SOC 210 includes generally a system management unit (SMU) 211, a system management network (SMN) 212, a central processing unit (CPU) core complex 220 labelled "CCX", a graphics controller 230 labelled "GFX", a real-time client subsystem 240, a memory/client subsystem 250, a data fabric 260, memory channels 270 and 280, a Peripheral Component Interface Express (PCIe) subsystem 290, and a cache 500 operating as a last-level cache and labelled "LLC". As will be appreciated by a person of ordinary skill, SOC 210 may not have all of these elements present in every embodiment and, further, may have additional elements included therein.

SMU 211 is bidirectionally connected to the major components in SOC 210 over SMN 212. SMN 212 forms a control fabric for SOC 210. SMU 211 is a local controller that controls the operation of the resources on SOC 210 and synchronizes communication among them. SMU 211 manages power-up sequencing of the various processors on SOC 210 and controls multiple off-chip devices via reset, enable and other signals. SMU 211 includes one or more clock sources (not shown), such as a phase locked loop (PLL), to provide clock signals for each of the components of SOC 210. SMU 211 also manages power for the various processors and other functional blocks, and may receive measured power consumption values from CPU cores in CPU core complex 220 and graphics controller 230 to determine appropriate P-states.

CPU core complex 220 includes a set of CPU cores, each of which is bidirectionally connected to SMU 211 over SMN 212. Each CPU core may be a unitary core only sharing a last-level cache with the other CPU cores, or may be combined with some but not all of the other cores in clusters.

Graphics controller 230 is bidirectionally connected to SMU 211 over SMN 212. Graphics controller 230 is a high-performance graphics processing unit capable of performing graphics operations such as vertex processing, fragment processing, shading, texture blending, and the like in a highly integrated and parallel fashion. In order to perform its operations, graphics controller 230 requires periodic access to external memory. In the embodiment shown in FIG. 2, graphics controller 230 shares a common memory subsystem with CPU cores in CPU core complex 220, an architecture known as a unified memory architecture. Because SOC 210 includes both a CPU and a GPU, it is also referred to as an accelerated processing unit (APU).

Real-time client subsystem 240 includes a set of real-time clients such as representative real time clients 242 and 243, and a memory management hub 241 labelled "MM HUB". Each real-time client is bidirectionally connected to SMU 211 over SMN 212, and to memory management hub 241. Each real-time client could be any type of peripheral controller that require periodic movement of data, such as an image signal processor (ISP), an audio coder-decoder (codec), a display controller that renders and rasterizes objects generated by graphics controller 230 for display on a monitor, and the like.

Memory/client subsystem 250 includes a set of memory elements or peripheral controllers such as representative memory/client devices 252 and 253, and a system and input/output hub 251 labeled "SYSHUB/IOHUB". Each memory/client device is bidirectionally connected to SMU 211 over SMN 212, and to system and input/output hub 251. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 260 is an interconnect that controls the flow of traffic in SOC 210. Data fabric 260 is bidirectionally connected to SMU 211 over SMN 212, and is bidirectionally connected to CPU core complex 220, graphics controller 230, memory management hub 241, system and input/output hub 251. Data fabric 260 includes a crossbar switch for routing memory-mapped access requests and responses between any of the various devices of SOC 210. It includes a system memory map, defined by a basic input/output system (BIOS), for determining destinations of memory accesses based on the system configuration, as well as buffers for each virtual connection.

Memory channels 270 and 280 are circuits that control the transfer of data to and from external memories 273 and 283. Memory channel 270 is formed by a memory controller 271 and a physical interface circuit 272 labelled "PHY" connected to external memory 273. Memory controller 271 is bidirectionally connected to SMU 211 over SMN 212 and has an upstream port and a downstream port. Physical interface circuit 272 has an upstream port bidirectionally connected to memory controller 271, and a downstream port bidirectionally connected to external memory 273. Similarly, memory channel 280 is formed by a memory controller 281 and a physical interface circuit 282 connected to external memory 283. Memory controller 281 is bidirectionally connected to SMU 211 over SMN 212 and has an upstream port bidirectionally connected to data fabric 260, and a downstream port. Physical interface circuit 282 has an upstream port bidirectionally connected to memory controller 281, and a downstream port bidirectionally connected to external memory 283. Cache 500 is bidirectionally connected to SMU 211 over SMN 212 and has an upstream port bidirectionally connected to data fabric 260, and a downstream port connected to the upstream port of memory controller 271.

Peripheral Component Interface Express (PCIe) subsystem 290 includes a PCIe controller 291 and a PCIe physical interface circuit 292. PCIe controller 291 is bidirectionally connected to SMU 211 over SMN 212 and has an upstream port bidirectionally connected to system and input/output hub 251, and a downstream port. PCIe physical interface circuit 292 has an upstream port bidirectionally connected to PCIe controller 291, and a downstream port bidirectionally connected to a PCIe fabric, not shown in FIG. 2. PCIe controller 291 is capable of forming a PCIe root complex of a PCIe system for connection to a PCIe network including PCIe switches, routers, and devices.

In operation, SOC 210 integrates a complex assortment of computing and storage devices, including CPU core complex 220 and graphics controller 230, on a single chip. Most of these controllers are well-known and will not be discussed further. SOC 210 includes multiple internal buses for conducting data between these data elements at high speed. For example, CPU core complex 220 accesses data over a high-speed 32-bit bus through an upstream port of data fabric 260. Data fabric 260 multiplexes accesses between any of a number of memory accessing agents connected to its upstream ports, and memory accessing responders connected to its downstream ports. Because of the large number of memory accessing agents and memory accessing responders, the number of internal bus lines is quite large as well and the crossbar switch in data fabric 260 multiplexes these wide buses to form virtual connections between the memory access requesters and the memory accessing responders.

The various processing nodes also maintain their own cache hierarchies. In a typical configuration, CPU core complex 220 includes four CPU cores each having its own dedicated level-one (L1) and level two (L2) caches, and having a level three (L3) cache shared between the four CPU cores in the cluster. In this example, cache 500 would form a level four (L4) cache, but regardless of the internal organization of the cache hierarchies in CPU core complex 220, it operates as the last-level cache in the cache hierarchy. In one example, cache 500 implements an inclusive cache, in which any cache line stored in any higher-level cache in SOC 210 will also be stored in cache 500. In another example, cache 500 is a victim cache, and includes cache lines each of which contained data that was requested by a data processor at an earlier point in time, but ultimately became the least recently used cache line and was evicted from all upper-layer caches.

According to various embodiments to be described here, cache 500 selectively stores data in each cache line an inverted format to reduce the number of transitions when the data is transferred over an internal bus. It does so by analyzing the number of transitions on the bus bit lanes between consecutive data elements and determining whether to invert subsequent transitions based on the least amount of energy consumed in the transfer. The decision whether to implement this feature is itself selected based on other characteristics of the data. Overall, for just a few extra metadata bits and a small number of format bits, the transfer of data through SOC 210 can be done in a more power efficient manner, significantly reducing the overall power consumption of SOC 210 under typical workloads. The power savings can be significant not only in data processing systems having buses to cache 500 that switch at high speeds, but also in data processing systems with larger and/or longer buses even though they may switch at slower speeds.

Figure 3:
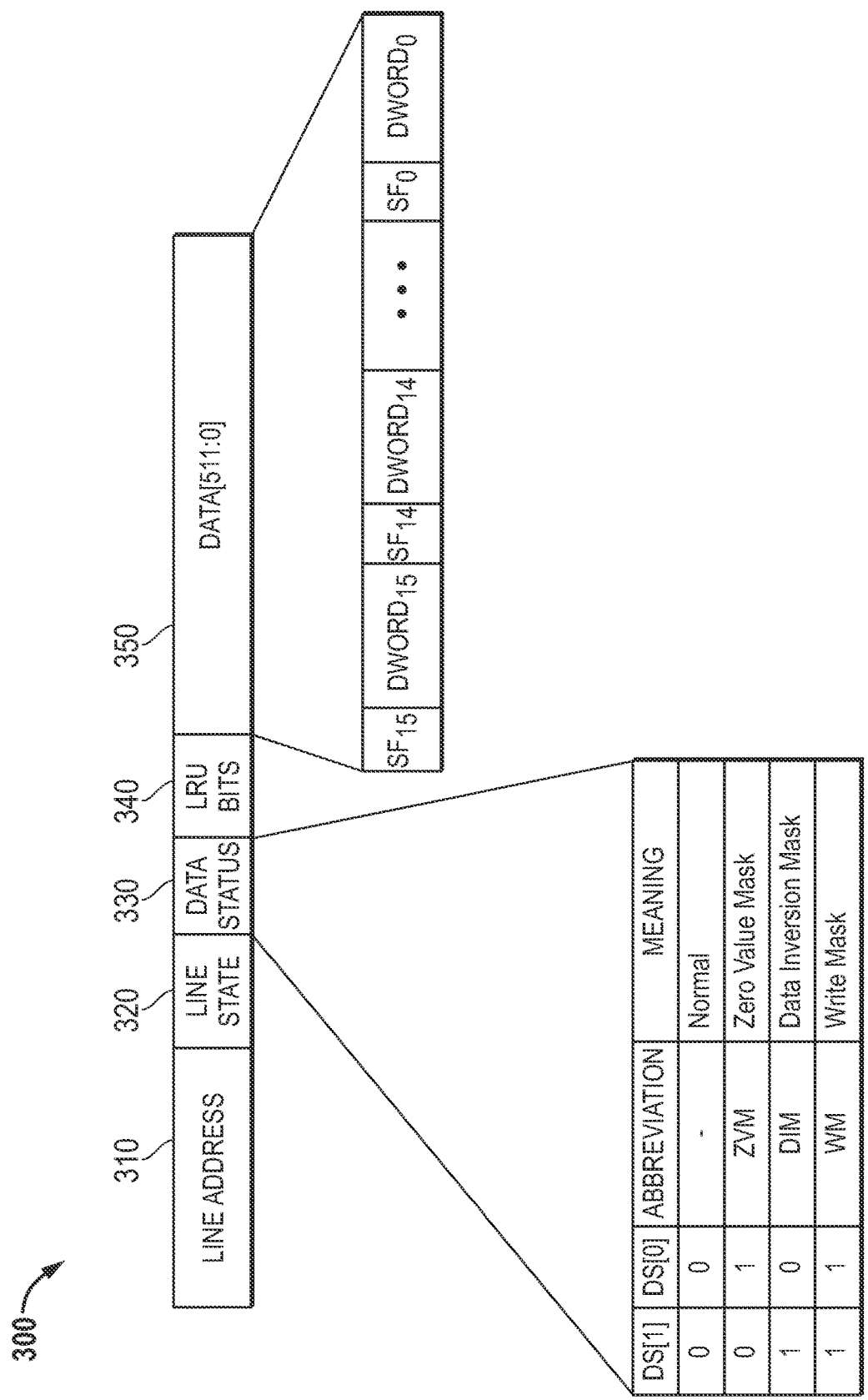
FIG. 3 illustrates in block diagram form a cache line that can be used in the cache of FIG. 2 according to some embodiments.

FIG. 3 illustrates in block diagram form a format of a cache line 300 that can be used in cache 500 of FIG. 2 according to some embodiments. Cache line 300 generally includes a line address 310, a line state 320, a data status field 330, LRU bits 340, and a data field 350. Line address 310, line state 320, and LRU bits 340 function in the same way as line address 110, line state 120, and LRU bits 130 described above.

Data field 350 stores data as well as additional special function bits labelled "SF" that indicate the state of the associated double word. For example, a special function bit labelled "$SF_{15}$" stores a special function bit for a double word of data labelled. "$DWORD_{15}$", a special function bit labelled "$SF_{14}$" stores a special function bit for a double word of data labelled "$DWORD_{14}$", and so on. In the example shown in FIG. 3, cache line 300 stores 64 B of data organized in 16 double words, in Which each double-word contains 32 bits. Thus, each double word stores a data element whose bits would be transmitted during the same bus cycle on an internal bus a SOC 210 when the cache line is accessed, written back to main memory during writeback or eviction, etc.

Data status field 330, along with line state 320 and LRU bits 340, store metadata for cache line 300. Data status field 330 indicates how the data is stored in data field 350. In the embodiment shown in FIG. 3, data status field 330 includes two bits labelled "DS[1]" and "DS[0]" that encode one of four possible states.

In a first state in which DS[1:0]=00, the data is stored normally in data field 350, i.e., without being inverted. The SF bits are don't-cares and data is stored into and read from data field 350 normally.

In a second state in which DS[1:0]=01, the data is stored with the SF hit containing a zero value mask (ZVM) bit for each double word. In typical data structures, many data elements have values of 0. If a double word has a value of zero, then there is no need to explicitly store 0s in the data field and switch bits on the bus during transfers. Thus, cache 500 saves power by suppressing the storing and reading of the data since the extra DIM bit makes the actual value a don't-care.

In a third state in which DS[1:0] 10, the data is stored with the SF bit containing a data inversion mase (DIM) bit for each double word. In this case the SF bit is a 1 to indicate the corresponding double word is stored in inverted form, and is a 0 to indicate the corresponding double word is stored in non-inverted form. When in the DIM mode, the decision about whether to invert any particular data element is made by analyzing the number of transitions between a given double word and a subsequent double word in the sequence indicated by data field 350. For example, if the number of transitions of the thirty-two bits from $DWORD_0$ to $DWORD_1$ greater than sixteen bits, then $SF_1$ is set to 1 and $DWORD_1$ is stored in its cache line in inverted format. Then in a subsequent access, the number of transitions on the data bus is reduced, saving power during operation.

In a fourth state in which DS[1:0]=11, the data is stored with the SF bit containing a write mask bit for each double word. In the write mask mode, double words which are not modified do not have to change the states of the values on the bus.

Cache 500 sets the DATA STATUS state selectively, depending on the values of the data. An algorithm for determining the DATA STATUS state will now be described.

Figure 4:
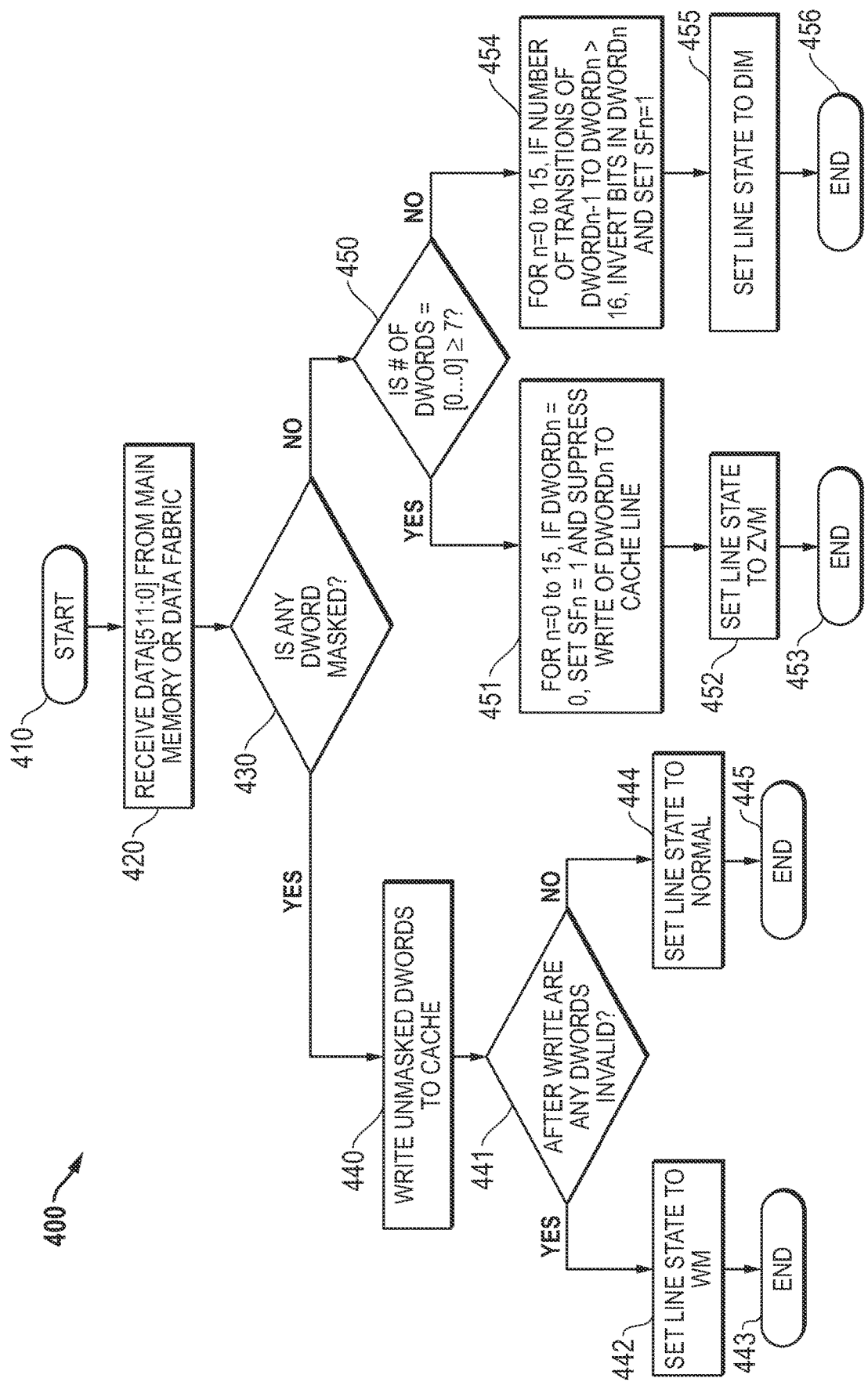
FIG. 4 illustrates a flow chart of a flow showing the operation of the cache of FIG. 2 according to some embodiments.

FIG. 4 illustrates a flow chart of a flow 400 reflecting how cache 500 of FIG. 2 decides to set the data status field according to some embodiments. Flow starts at box 410, which corresponds to an allocation of a cache line. At action box 420, cache 500 receives a data element from main memory (e.g., in the case of a cache line fill operation), or from data fabric 260 (e.g., in the case of a write-back operation). In a decision box 430, cache 500 determines whether any double word is masked, which would occur, for example, in the case of a writeback in which only certain double words are modified.

If any double-word is masked, then in an action box 440 cache 500 writes the unmasked double words to the cache line. In a decision box 441, cache 500 determines whether any double words are marked invalid. If so, then flow proceeds to an action box 442 which sets the line state to WM, and an action box 443 in which flow 400 ends. If not, then flow proceeds to an action box 444 which sets the line state to NORMAL, and an action box 445 in which flow 400 ends.

If no double-word is masked, then in a decision box 450, cache 500 determines whether the number of double words having all of its respective bits equal to zero is greater than or equal to 7. If so, then in an action box 451, for each double word that is all zeros, cache 500 sets the corresponding SF bit to 1 and suppresses the writing of the data word to the data portion of the cache line. In other words, i.e., if for n=0 to 15, if $DWORD_n=0\times0$, then $SF_n=1$ and cache 500 suppresses the writing of $DWORD_n$ to data field 350. Then in an action box 452, cache 500 sets the line state to ZVM, and in an action box 453, flow 400 ends.

If not, then in an action box 454, cache 500 determines for each data transition whether the number of transitions between each pair of double words is greater than half of the data bus width, in this example 16. In other words, i.e., if for n=0 to 15, if the number of transitions of $DWORD_n$ to $DWORD_{n+1} \geq 16$, then cache 15 inverts the bits before storing them in data field 350, and sets the corresponding $SF_{n+1}$ bit for $DWORD_{n+1}$ to 1, otherwise cache 500 stores DWORDn+1 in data field 350 and sets the corresponding $SF_{n+1}$ bit for $DWORD_{n+1}$ to 0. Then in an action box 455, cache 500 sets the line state to DIM, and in an action box 456, flow 400 ends.

It should be apparent that flow 400 just represents one exemplary flow for data storage in cache 500 using selective data inversion masking combined with other data storage modes. In other embodiments, flow 400 can be modified to support fewer or more selective data storage modes.

Figure 5:
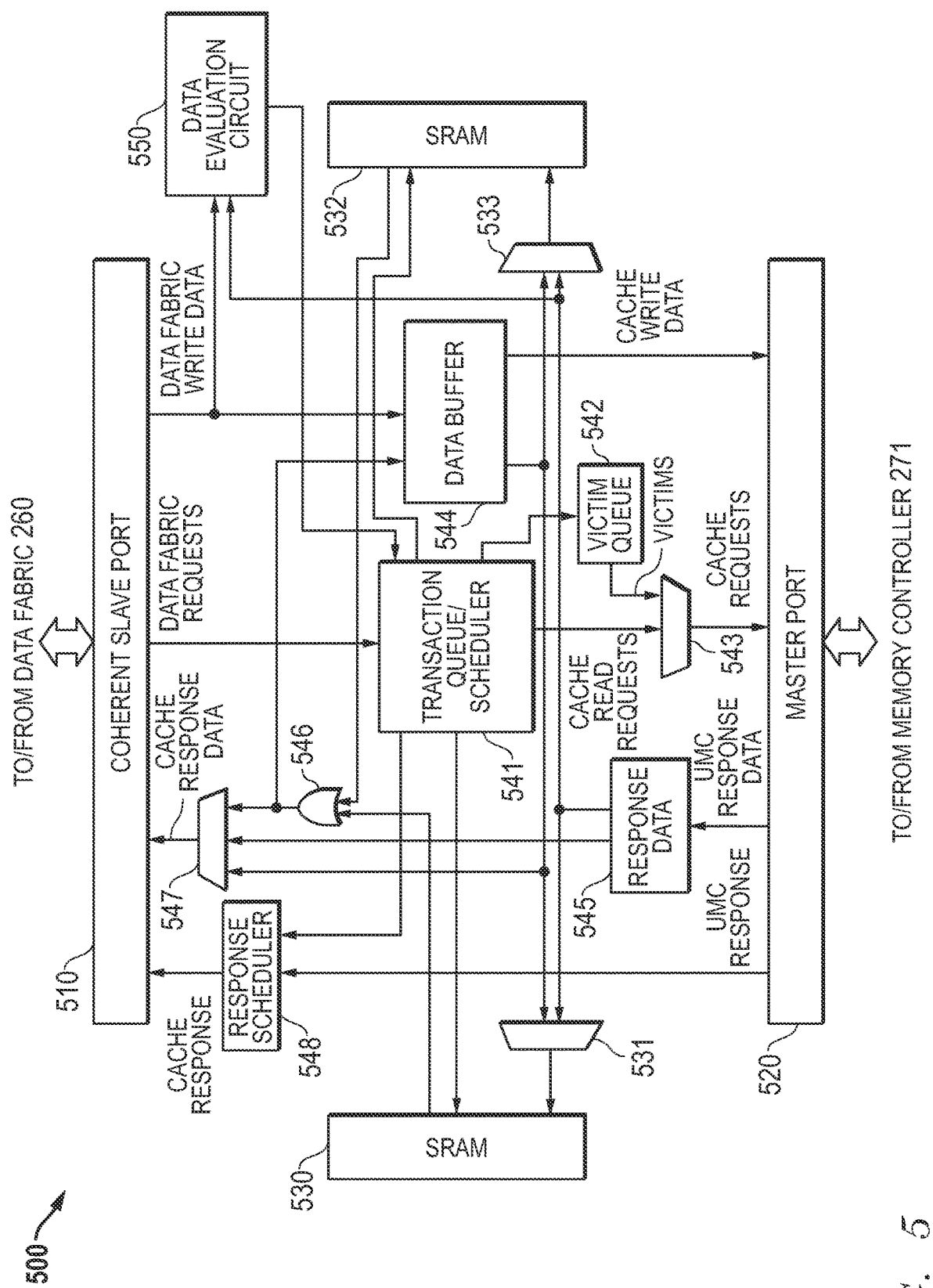
FIG. 5 illustrates in block diagram form the cache of FIG. 2 according to some embodiments.

FIG. 5 illustrates in block diagram form cache 500 of FIG. 2 according to some embodiments. Cache 500 includes generally a coherent slave port 510, a master port 520, static random-access memories (SRAMs) 530 and 532, and a cache controller 540.

Coherent slave port 510 is an upstream port that is bidirectionally connected to data fabric 260, and has a first input for receiving a signal labelled "CACHE RESPONSE", a second input for receiving a signal labelled "CACHE RESPONSE DATA", a first output for providing a signal labelled "DATA FABRIC REQUESTS", and a second output for providing a signal labelled "DATA FABRIC WRITE DATA". Master port 520 is a downstream port having a first input for receiving a signal labelled "CACHE REQUESTS", a second input for receiving a signal labelled "CACHE WRITE DATA", a first output for providing a signal labelled "UMC RESPONSE", a second output for providing a signal labelled "UMC RESPONSE DATA", and a downstream port connected to memory controller 271. SRAM 530 has an input for receiving addresses and data, and an output for providing data. A multiplexer 531 is associated with SRAM 530 and has a first input, a second input, and an output connected to the input of SRAM 530. Similarly, SRAM 532 has an input for receiving addresses and data, and an output for providing data. A multiplexer 533 is associated with SRAM 532 and has a first input, a second input, and an output connected to the input of SRAM 532.

Cache controller 540 includes a transaction queue/scheduler 541, a victim queue 542, a multiplexer 543, a data buffer 544, a response data buffer 545, an OR gate 546, a multiplexer 547, a response scheduler 548, and a data evaluation circuit 550. Transaction queue/scheduler 541 has a first input connected to the first output of coherent slave port 510 for receiving the DATA FABRIC REQUESTS, a second input, a first output for providing a signal labelled "CACHE READ REQUESTS", a second output for providing victim cache lines, a third output for providing responses, and a fourth output for providing metadata for the cache lines. Victim queue 542 has an input connected to the second output of transaction queue/scheduler 541, and an output for providing a value labelled "VICTIMS". Multiplexer 543 has a first input connected to the first output of transaction queue/scheduler 540 for receiving the CACHE READ REQUESTS, a second input connected to the output of victim queue 542 for receiving the VICTIMS, and an output connected to the first input of master port 520 for providing the CACHE REQUESTS. Data buffer 544 has a first input, a second input connected to the second output of coherent slave port 510 for receiving the DATA FABRIC WRITE DATA, a first output connected to the first inputs of multiplexers 531 and 533, and a second output connected to the second input of master port 520 for providing the CACHE WRITE DATA.

Response data buffer 545 has an input connected to the second output of master port 520 for receiving the UMC RESPONSE DATA, a first output, and a second output connected to the second inputs of multiplexers 531 and 533. OR gate 546 has a first input connected to the output of SRAM 530, a second input connected to the output of SRAM 532, and an output connected to the first input of data buffer 544. Multiplexer 547 has a first input connected to the first output of data buffer 544, a second input connected to the first output of response data buffer 545, and an output connected to the second input of coherent slave port 510 for providing the CACHE RESPONSE DATA. Response scheduler 548 has a first input connected to the first output of master port 520 for receiving the UMC RESPONSE, a second input connected to the third output of transaction queue/scheduler 541, and an output for providing the CACHE RESPONSE to the first input of coherent slave port 510.

Data evaluation circuit 550 has a first input connected to the first output of coherent slave port 510, a second input connected to the second output of coherent slave port 510, and an output connected to the second input of transaction queue/scheduler 541.

Cache 500 is a last-level cache (LLC) and coherency point in data processing system 200, but according to the principles herein, cache 500 could be at another level of the cache hierarchy. It is organized as a set-associative, inclusive LLC and thus has a large data store implemented using SRAMs 530 and 532 as the cache memory that are separated into two parts to ease routing delays. For example, in one embodiment, cache 500 can be a 4 MB (4 megabyte), 16-way set associative cache in a system having 4 GB (4 gigabytes) of main memory. Thus, at any time, cache 500 would store no more than 1/1000 of the contents of main memory.

Data evaluation circuit 550 receives the DATA FABRIC WRITE DATA from coherent slave port 510 and the UMC RESPONSE DATA from response data buffer 545, and performs an evaluation of the data to selectively set the DATA STATUS and SF bits according to flow 400 of FIG. 4. In particular, data evaluation circuit 550 determines whether there are any masked double words in the data and whether there are any double words with values of 0×0 and if so, how many. If the flow proceeds to the data inversion mask leg, then data evaluation circuit 550 determines whether a number of transitions of data bits of each pair of successive double words exceeds one-half of the transfer width, and if so, sets a corresponding data bus inversion bit in the cache memory formed by SRAMs 530 and 532.

By performing selective data inversion masking of data stored in it, cache 500 causes there to be fewer transitions of data signals that are transmitted serially over large and highly capacitive buses that require significant energy to switch the logic states of the signals on the buses. The data is not only inverted, but pre-stored in inverted form for rapid access. The ZVM, DIM, and SF bits are transmitted through some or all of the data path from cache 500 to a requesting device or a higher-level cache, but eventually converted to normal format before being read and processed by the requesting device. This technique reduces power consumption in modern complex SOCs, thereby prolonging battery life and contributing to better user experience of the end products they are used in.

An integrated circuit that implements SOC 210 or cache 500 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, cache 500 can be an LLC or could be another cache higher in the cache hierarchy. In addition, the selective data inversion mask state can be combined with other selective encoding options, such as selective inversion to bias data words toward a particular logic state, and other combinations of supported encoding options. Moreover, while inversion was chosen if more than half the number of data bits changed logic state, the number of data bits that trigger inversion could be higher to take into account the extra energy required to perform the inversion. While the disclosed technique was performed for initial cache line fill operations, data inversion could be evaluated again after data is modified while allocated to the cache.

Accordingly, it is intended by the appended claims to cover all modifications of the disclosed embodiments that fall within the scope of the disclosed embodiments.

What is claimed is:

1. A cache, comprising:
   an upstream port;
   a cache memory for storing cache lines each having a line width; and
   a cache controller coupled to said upstream port and said cache memory, wherein said upstream port transfers data words having a transfer width less than said line width, wherein in response to a cache line fill, said cache controller selectively determines data bus inversion information for a sequence of data words having said transfer width based on whether a number of transitions of data bits of each pair of successive data words exceeds one-half of said transfer width, and stores said data bus inversion information along with selected inverted data words for said cache line fill in said cache memory.

2. The cache of claim 1, wherein said cache controller comprises:
   a data evaluation circuit coupled to said upstream port for determining whether said number of transitions of data bits of each pair of successive data words exceeds one-half of said transfer width, and if so, setting a corresponding data bus inversion bit in said cache memory.

3. The cache of claim 2, wherein:
   said data evaluation circuit further determines whether more than a threshold number of data words of a first cache line have a value of zero; and
   if more than said threshold number of data words have said value of zero, said cache controller stores a zero value mask state for said first cache line, and a zero value bit for each data word indicating whether each data word has said value of zero.

4. The cache of claim 3, wherein said data evaluation circuit further:
   suppresses determining said data bus inversion information for said sequence of data words and storing said data bus inversion information along with said selected inverted data words for said cache line fill in said cache memory, in response to said zero value mask state.

5. The cache of claim 3, wherein:
   said data evaluation circuit further suppresses determining said data bus inversion information for said sequence of data words and storing said data bus inversion information along with said selected inverted data words for said cache line fill in said cache memory in response to said zero value mask state.

6. The cache of claim 1, further comprising:
   a downstream port coupled to said cache controller and adapted to be coupled to a lower-level memory system.

7. A data processing system, comprising:
   a plurality of memory access requestors;
   a plurality of memory access responders;
   a data fabric for selectively coupling said plurality of memory access requestors to said plurality of memory access responders; and
   a cache coupled to said data fabric, wherein said cache comprises:
      a cache memory for storing cache lines each having a line width; and
      a cache controller coupled to said cache memory, for transferring data words having a transfer width less than said line width, wherein in response to a cache line fill, said cache controller selectively determines data bus inversion information for a sequence of data words having said transfer width based on whether a number of transitions of data bits of each pair of successive data words exceeds one-half of said transfer width, and stores said data bus inversion information along with selected inverted data words for said cache line fill in said cache memory.

8. The data processing system of claim 7, wherein said cache controller comprises:
   a data evaluation circuit coupled to said data fabric for determining whether said number of transitions of data bits of each pair of successive data words exceeds one-half of said transfer width, and if so, setting a corresponding data bus inversion bit in said cache memory.

9. The data processing system of claim 8, wherein:
said data evaluation circuit further determines whether more than a threshold number of data words of a first cache line have a value of zero; and
if more than said threshold number of data words have said value of zero, said cache controller stores a zero value mask state for said first cache line, and a zero value bit for each data word indicating whether each data word has said value of zero.

10. The data processing system of claim 9, wherein said data evaluation circuit further:
suppresses determining said data bus inversion information for said sequence of data words and storing said data bus inversion information along with said selected inverted data words for said cache line fill in said cache memory, in response to said zero value mask state.

11. The data processing system of claim 9, wherein:
said data evaluation circuit further suppresses determining said data bus inversion information for said sequence of data words and storing said data bus inversion information along with said selected inverted data words for said cache line fill in said cache memory in response to said zero value mask state.

12. The data processing system of claim 7, wherein:
said cache has an upstream port coupled to said data fabric, and a downstream port coupled to a lower-level memory system.

13. The data processing system of claim 12, wherein said lower-level memory system comprises:
a memory controller coupled to said downstream port of said cache;
a physical layer interface coupled to said memory controller; and
a dynamic random-access memory coupled to said physical layer interface.

14. The data processing system of claim 7, wherein said data fabric establishes virtual connections using crossbar switching between each of said plurality of memory access requestors and each of said plurality of memory access responders.

15. The data processing system of claim 7, wherein said plurality of memory access requestors comprises a plurality of central processing unit cores each having at least one cache, and wherein said cache it a last level cache (LLC) of a cache hierarchy.

* * * * *